UNITED STATES PATENT OFFICE.

AUGUSTE P. DUBRUNFAUT, OF PARIS, FRANCE.

SACCHARIFICATION OF AMYLACEOUS MATTERS BY MALT, &c.

SPECIFICATION forming part of Letters Patent No. 242,439, dated June 7, 1881.

Application filed April 23, 1881. (No specimens.) Patented in France March 2, 1881.

*To all whom it may concern:*

Be it known that I, AUGUSTE PIERRE DUBRUNFAUT, of Paris, in the Republic of France, have invented a certain new and useful Improvement in the Saccharification of Amylaceous Matters by Malt, and the preparation therefrom of massive maltose, crystal sirup, and other products, of which improvement the following specification is a full description.

Contrary to the generally received opinion, I have discovered that malt, its infusions and active isolated products—such as diastase and maltine—contain invariably two active materials, perfectly distinct from each other in their properties, mode of action, and chemical constitution. One of the matters is the agent by which starch is converted into dextrine. The other, totally inert and inactive upon starch proper, is exclusively the agent for transforming dextrine into a sort of glucose, known as "maltose." In conformity with the received nomenclature of organic chemistry, I designate them as respectively "dextrinose" and "maltose." These two products, apparently soluble, like diastase and maltine, have a quarternary and saline constitution, like the organized ferments, properly called, analogous to alcoholic ferments. In a purely chemical and physiological point of view, from the consideration of the different chemical and physical properties of dextrinose and maltose, it cannot be doubted that they consist in reality of veritable living organisms, whose modes of reproduction are unknown, and which exist in so fine a state of division that their condition in a liquid is confounded with that of a true solution. Dextrinose and maltose, not having been isolated, and still less brought to a chemically pure state, cannot be described as such; but by proper methods and experiments it is possible to distinguish them by their very different modes of action in presence of starch-paste, in the same or in different conditions. It is possible, moreover, by comparative study of the active properties of different mixtures and analyses of the malts, to arrive at approximately the probable proportions of their mixture in the malts of commerce, in their infusions, or even in diastase and maltine.

Dextrinose, considered as a quarternary product, has very nearly the constitution accepted for maltine—that is to say, it contains six to seven per cent. of nitrogen and one to two per cent. of ash or various mineral substances—potash, lime, magnesia, phosphoric acid, &c. Maltose, however, resembles albuminoid matters, properly called—that is, it contains thirteen to fourteen per cent. of nitrogen and one to two per cent. of mineral substances. Since this material, which, as already stated, is the sole agent of saccharification, is of a chemical constitution like that of ozotized or nitrogenous matter, (which Payen, in the described processes for the preparation of diastase pure and free from nitrogen, directs to be eliminated by being heated to 75° centigrade,) it is easily seen why Payen and his followers have only prepared active material very much altered in character.

Dextrinose and maltose exert their maximum activity in malt in grain and in cold-made infusions, and both are more or less altered by the action of heat and the chemical agents—alcohol, for example—which have been prescribed for their isolation; but maltose is very much more affected than dextrinose. The latter exerts its maximum effect at 70° to 75° centigrade, while the properties of maltose, much impaired by this temperature, are at their best at much lower temperature—50° centigrade and below.

To these peculiarities are due the difficulties, and consequently the imperfection, of the industrial operations employing malt as at present carried on.

Good malt of commerce appears to contain dextrinose and maltose in nearly equal proportions. From the investigations which I have made it seems probable that malt contains not less than one per cent. of its weight of dextrinose and the same quantity of maltose.

How and by what series of transformations these two organized ferments are produced it is impossible now to say; but everything indicates that, like the yeast of beer, they are produced by germs under conditions still unknown or ill defined, since the industrial operation in which they are utilized, instead of producing them as brewing produces yeast, appears to alter, impair, or destroy them, as happens with yeast in the production of alcohols from pure sugar, molasses, and analogous bodies.

Considering it established that dextrinose and maltose exist in equal proportions in commercial malts, dextrinose in the usual industrial conditions transforms at once into dextrine one hundred and fifty to two hundred thousand times its weight of amylaceous matter at the temperature 70° centigrade; but maltose can only saccharify one to two thousand times its weight of starch previously converted into dextrine, and this effect is not produced with perfection nor completely except at a temperature not exceeding 50° centigrade and prolonged for two or three periods of twenty-four hours. This, then, is the present condition of scientific knowledge and of the industrial applications of malt based on that knowledge, taking account also of the various conditions heretofore described for the saccharification of maltine with a view to alcoholic fermentations. Thus, to obtain from malt the maximum useful effect for the production of alcohol, the starch should be macerated at a temperature of 70° centigrade at the minimum, and in a volume of water not less than fifteen to twenty times the weight of the amylaceous matter, and the proportions of malt or its infusion employed should be about forty per cent. to fifty per cent. of the weight of said matter. If a smaller proportion of malt be used, a considerable part of the amylaceous matter escapes the action of the dextrinose and remains in the macerating-liquor in a peculiar state, to which the name of "insoluble dextrine" has been given. Insoluble dextrine, which is inactive in the presence of iodine or malt solutions, is saccharified by acids.

By using malt in the proportion of one hundred per cent. of the weight of the fecula the saccharification is accelerated, no trace of insoluble dextrine is obtained, and the production of alcohol corresponds to the theoretical maximum, (forty-eight to fifty liters of alcohol for one hundred kilograms of hydrated fecula, in place of the thirty-five to thirty-six obtained in saccharification by acids.)

It might be supposed that under these conditions the maximum quantity of maltose, which is the invariable and characteristic saccharine product of the reaction of maltose upon starch, would be produced. If, however, the liquid or must prepared in the manner just described be reduced by concentration to a dense sirup, crystallization will not take place contrary to what might be expected, in view of the ready crystallization of maltose. If this sirup or other sirups not so well prepared be treated by osmose, all the maltose can readily be separated on account of its ready diffusibility, and the waters of exosmose, when suitably concentrated, crystallize in massive maltose by simple cooling. In this way, then, massive maltose can be industrially prepared just as glucose is prepared in the same state by sulphuric acid, only, as the maltose is free from the impurities which accompany glucose and represents the chemical saccharine equivalent of the starch, it is altogether superior to glucose in quality, flavor, and yield of sugar.

The industrial manufacture of crystallized and massive maltose can be carried on more simply and without having to resort to the operation of osmose in the following way: The starch or amylaceous matter is mixed with from twelve to fifteen times its weight of water and the temperature is raised to 70° centigrade. The thin paste is then treated, at a temperature not above 50° centigrade, with an exhausted infusion of malt representing in solid malt twenty-five per cent. to thirty per cent. of the weight of amylaceous matter. The mixture is then allowed to remain at a temperature of 50° centigrade for, say, sixty to seventy hours, until the dextrine is completely transformed into maltose. The progress of the operation can be ascertained by, first, the reaction with iodine; second, the rotative power of the solutions, and, third, the reactions with compounds of copper.

Observation of the following principles will enable one to proceed with the testing methodically: A solution or mixture of one hundred grams commercial starch (containing twenty per cent. water and eighty per cent. fecula) in water sufficient to form a liter, and transformed into dextrine by dextrinose, has a density of 5° of Baumé's aerometer, and at 15° centigrade, the rotative power observed with a saccharometer having a tube of 0$^m$.2 is very near 140° to 142° $f$.

There is no power of reducing power upon copper-salts. The liquid macerated at 50° centigrade in presence of maltose undergoes, more or less rapidly, according to the conditions of the experiment, a reduction of rotative power, and at the same time develops a progressive reducing power upon copper-salts without sensible alteration in density. When saccharification is complete—that is to say, when the dextrine has been transformed almost entirely into maltose—the rotation falls from 140° to 110° $f$, and the reducing power obtains a figure corresponding to a production of seventy-five parts of maltose for one hundred hydrated fecula—that is, ninety per cent. or ninety-two per cent. of the dry starch. When these results, requiring a maceration of sixty to seventy-two hours, have been obtained, it is certain that very nearly all the amylaceous material has been transformed into maltose.

By oxidizing the malt infusion until it presents a sensible yellow color the maltose is rendered much more active and the time required for saccharification is lessened.

After saccharification the resulting liquor is clarified and filtered over non-alkaline black, in grains, and boiled in a vacuum or other pan, and the product is a colorless sirup, which crystallizes in mass on cooling without material change in bulk, such as take place with massive glucose and sirups of commerce, which greatly increase in crystallizing.

The maltose thus prepared can be readily separated from the mother-liquid by pressure, and by remelting and recrystallizing can be obtained chemically pure. The pure material, dried by stove-heat, will keep for an indefinite time without alteration, and, on account of its purity and saccharine flavor, it is greatly to be preferred to the glucose of commerce. As it contains in a pure condition the saccharine principle of brewers' wort, it is better adapted for brewing than ordinary glucose. As for brewing purposes various qualities are required, sirups adapted to the particular needs can be made. Thus, to produce those analogous to the crystal sirups of commerce, it suffices to arrest the maceration in the middle of the operation before described—that is to say, when the rotation of the liquid has fallen to 125° and the reducing power has risen to 36 or 37.

Sirup thus prepared is perfectly transparent and limpid, and is not altered by time. For certain purposes—for making confectionery, for example—the richness can be increased by the addition of maltose or by stopping the macerating operation at a more advanced stage. Similar sirups having a density of 36° to 38° Baumé can be indefinitely preserved and can be transported to a distance without alteration. They can be made again into must or wort, and by the addition of hops and yeasts and by the treatment in accordance with known methods very excellent beer can be made, a thing vainly sought to be accomplished with the must or wort of beer concentrated to the state of sirup. The alterations observed in the latter case are due to the nitrogenous matters of the malt, which ultimately become energetic ferments.

The crystallized or massive maltose sugars and the crystal sirups containing more or less dextrine, just described, can be prepared from all the cereal grains and from all known farinaceous grains—maize, rice, buckwheat, Indian millet, and the like.

The grain may, with advantage, be prepared by steeping in cold water and breaking or crushing in suitable apparatus, in place of being ground.

The processes described can be utilized and applied directly in brewing and distilling, and it is obvious that as the maximum of maltose—that is, the maximum of fermentable matter—is produced, in brewing the maximum quantity of beer with the minimum of residue will be obtained, and in distilling the maximum of alcohol from the farinaceous matter employed.

Having now fully explained the said invention and the manner of carrying the same into effect, what I claim is—

1. The method of producing maltose by treating starch with malt at substantially the temperature described.

2. The production of massive maltose and crystal sirups by treating starch in the presence of water with malt or its infusions, at the temperature and in the proportions substantially as described.

3. The method of increasing the activity of malt by oxidizing the infusion thereof, substantially as described.

4. The method of preparing pure maltose by saccharifying starch with malt, crystallizing, expressing the mother-liquid, remelting, and recrystallizing, in substantially the manner described.

5. The massive maltose and crystal sirups described, prepared from starch by the action of malt, in the manner set forth, and distinguishable by their purity and flavor.

6. Crystallized maltose purified and dried substantially as described.

In witness whereof I have hereunto signed my name in the presence of two subscribing witnesses.

DUBRUNFAUT (AUGUSTE PIERRE.)

Witnesses:
   ROBT. M. HOOPER,
   CHARLES MARDELET.